United States Patent [19]

Matsui et al.

[11] Patent Number: 4,758,348

[45] Date of Patent: Jul. 19, 1988

[54] COPOLYMER, SEPARATING MEMBRANE MADE THEREOF AND METHOD FOR SEPARATING CHARGE TRANSFER INTERACTIVE SUBSTANCE FROM A LIQUID MIXTURE CONTAINING THE SAME

[75] Inventors: Kiyohide Matsui; Kazuhiko Ishihara, both of Sagamihara; Isao Shinohara, Tokyo; Hiroyuki Nishide, Tokyo; Rieko Kogure, Tokyo, all of Japan

[73] Assignee: Sagami Chemical Research Center, Tokyo, Japan

[21] Appl. No.: 822,765

[22] Filed: Jan. 27, 1986

[30] Foreign Application Priority Data

Feb. 1, 1985 [JP] Japan .................................. 60-16667
Feb. 1, 1985 [JP] Japan .................................. 60-16668
Apr. 30, 1985 [JP] Japan .................................. 60-91118

[51] Int. Cl.$^4$ .............................................. B01D 31/00
[52] U.S. Cl. ................................ 210/651; 210/500.35; 210/500.41; 210/500.42; 585/819
[58] Field of Search ...................... 210/500.35, 500.41, 210/500.42, 649, 650, 651, 500.33; 585/819

[56] References Cited

U.S. PATENT DOCUMENTS

| | | | |
|---|---|---|---|
| 3,299,157 | 1/1967 | Baddour et al. | 585/819 |
| 3,320,328 | 5/1967 | Michaels | 585/819 |
| 3,504,048 | 3/1970 | Rosset | 585/819 |
| 3,567,632 | 3/1971 | Richter et al. | 210/500.41 |
| 3,726,934 | 4/1973 | Strazik et al. | 585/819 |
| 3,733,367 | 5/1973 | Perry et al. | 585/819 |
| 3,776,970 | 12/1973 | Strazik et al. | 585/819 |
| 3,784,620 | 1/1974 | Perry et al. | 585/819 |
| 3,791,994 | 2/1974 | Fuchiwaki et al. | 210/500.35 |
| 4,082,658 | 4/1978 | Faitzsch et al. | 210/500.31 |
| 4,115,465 | 9/1978 | Elfert et al. | 585/819 |
| 4,377,481 | 3/1983 | Jakabhazr | 210/500.35 |
| 4,388,189 | 6/1983 | Kawaguchi et al. | 210/500.28 |
| 4,596,860 | 6/1986 | Peaces | 210/500.41 |

*Primary Examiner*—Frank Sever
*Attorney, Agent, or Firm*—Oblon, Fisher, Spivak, McClelland & Maier

[57] ABSTRACT

A method for separating a charge transfer interactive substance from a liquid mixture containing such a substance, wherein the separation is conducted by means of a separating membrane made of a copolymer having charge transfer interactive groups.

34 Claims, No Drawings

COPOLYMER, SEPARATING MEMBRANE MADE THEREOF AND METHOD FOR SEPARATING CHARGE TRANSFER INTERACTIVE SUBSTANCE FROM A LIQUID MIXTURE CONTAINING THE SAME

BACKGROUND OF THE INVENTION

Field of the Invention

The present invention relates to a novel copolymer having charge transfer interactive groups, a separating membrane made thereof, and a method for separating a charge transfer interactive substance from a liquid mixture containing such a substance.

Discussion of Background

Heretofore, column chromatography was known as a method for separating substances by utilizing the charge transfer interactions of the substances. However, there has been no instance in which such interactions are utilized in a membrane separation method.

Column chromatography is essentially a non-continuous process which requires a step of desorbing the adsorped substance. Whereas, the membrane separation method does not require such a step, and can be conducted in a continuous process. Therefore, in the membrane separation method, the process can be simplified and is essentially of an energy-saving type. Thus, the membrane separation method is very practical as an industrial process.

A pervaporation method is known as a typical method for separating a liquid mixture by means of a non-porous homogeneous polymer membrane. This membrane separation method is effective for the separation of an organic liquid mixture which is hardly separable by a usual distillation method, such as an azeotropic mixture, a mixture of substances having close boiling points, a mixture of stereoisomers or a mixture containing a substance susceptible to thermal deterioration.

The separation of such a liquid mixture containing aromatic compounds, particularly a liquid mixture of aromatic nucleus-substituted isomers, has various industrial problems. For instance, for the separation of xylene isomers and ethyl benzene obtained as a $C_8$-fraction by petroleum refining, it is necessary to employ a combination of a series of processes such as precise fractional distillation, fractional crystallization and chemical reactions, or to repeat extremely cumbersome operations including specifically complexing the objective substance, followed by extraction and isolation. Therefore, it is strongly desired to develop an efficient method for such separation. It has been proposed to use the above-mentioned pervaporation method for this purpose. As separating membranes for the method, a crystalline polyethylene membrane, a cellulose derivative membrane and a cyclodextrin-containing polymer membrane are known. However, the former two are inferior in the selectivity, and the latter has an extremely poor permeability. Therefore, they are hardly practically used. Further, it has recently been proposed to incorporate a Werner complex capable of forming a clathrate compound specifically with such nucleus-substituted isomers into the membrane to improve the separating ability of the membrane. However, the conditions and the operations for the preparation of such a membrane are complex, and the permeability is still low. Therefore, such a membrane is still practically useless.

Thus, no polymer membrane has been proposed which is capable of efficiently separating a liquid mixture containing aromatic compounds, particularly a liquid mixture of aromatic nucleus-substituted isomers.

No separating membrane has been known which is designed to utilize the charge transfer interaction as the driving force for separation, as in the present invention.

SUMMARY OF THE INVENTION

Accordingly, it is an object of the present invention to provide a separating polymer membrane which is capable of efficiently separating a liquid mixture containing aromatic compounds, particularly a liquid mixture containing charge transfer interactive aromatic compounds.

A further object of the present invention is to provide a copolymer useful for the preparation of such a separating membrane.

Another object of the present invention is to provide a separation method by means of such a separating membrane.

Namely, the present invention provides a method for separating a charge transfer interactive substance from a liquid mixture containing such a substance, wherein the separation is conducted by means of a separating membrane made of copolymer having charge transfer interactive groups.

DETAILED DESCRIPTION OF THE PREFERRED EMBODIMENTS

In this specification, the word "charge transfer interactive" means "capable of causing charge transfer interaction". Thus, for example, a charge transfer interactive group means a group capable of causing charge transfer interaction.

The present invention also provides a copolymer comprising repeating units of the formula:

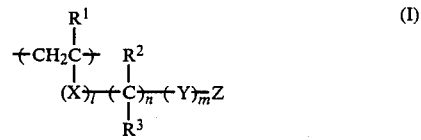

and repeating units of the formula:

wherein each of $R^1$, $R^2$, $R^3$ and $R^4$ is a hydrogen atom, a halogen atom or a hydrocarbon group having from 1 to 4 carbon atoms, X is an oxygen atom, a sulfur atom, an ester linkage, an amide linkage, a urethane linkage, an imine linkage, an iminoether linkage, a disulfide linkage, a sulfonyl linkage, an alkylene group or polymethylene group having from 1 to 4 carbon atoms, Y is a sulfur atom, an oxygen atom, an ester linkage, an amide linkage, a urethane linkage, an imine linkage, an iminoether linkage, a disulfide linkage, a sulfonyl linkage or a linkage having the formula:

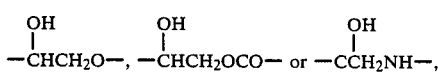

Z is a charge transfer interactive group, A is a hydrogen atom, a cyano group, a hydroxyl group, a carboxyl group, an amido group or a group having the formula:

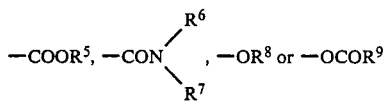

wherein $R^5$ is a hydrocarbon group having from 1 to 15 carbon atoms or a group having the formula:

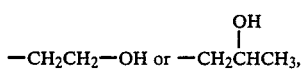

each of $R^6$ and $R^7$ is a hydrocarbon group having from 1 to 4 carbon atoms, each of $R^8$ and $R^9$ is a hydrocarbon group having from 1 to 6 carbon atoms, n is an integer of 0 to 10 and each of l and m is 0 or 1, provided that l, m and n are not 0 at the same time.

Furthermore, the present invention provides a separating membrane made of such a copolymer.

Now, the present invention will be described in detail with reference to the preferred embodiments.

It is generally known that an electron donating compound and an electron accepting compound together form a charge transfer complex. The formation of such a complex reflects the electron states in the molecules, and in most cases, the complex-forming abilities substantially differ even when the molecular structures are extremely similar to each other (Organic Charge-Transfer Complexes, Academic Press, 1969).

The present invention provides a separating membrane made of a copolymer having charge transfer interactive groups, whereby the formation of such a charge transfer complex by different molecules is ingeniously utilized to achieve highly efficient membrane separation.

In the present invention, the charge transfer interactive groups include electron accepting groups and electron donating groups. The electron accepting groups include aromatic groups substituted by at least one electron withdrawing group selected from the group consisting of nitro, cyano, carbonyl, sulfonyl, ammonium and halogen; pyridinium groups; and quinonyl groups. The electron donating groups include aromatic groups substituted by at least one member selected from the group consisting of alkyl, vinyl, allyl, amino, alkoxy and hydroxyl; naphthyl groups; anthryl groups; furyl groups; and pyrrolyl groups. Examples of the aromatic groups to be substituted include a phenyl group, a naphthyl group, an anthryl group, a furyl group, a pyrrolyl group, a pyridyl group, a thenyl group, an imidazolyl group, an indolyl group, a quinolinyl group.

In the membrane separation method of the present invention, a separating membrane made of a copolymer having electron accepting groups is useful for the separation of aromatic compounds having electron donating groups, and likewise, a separating membrane made of a copolymer having electron donating groups is useful for the separation of aromatic compounds having electron accepting groups.

The copolymers of the present invention comprise repeating units of the formulas I and II, as mentioned above. Such copolymers may be prepared, for instance, by reacting a homopolymer of a monomer having a reactive group represented by the formula:

wherein $R^1$ and X are as defined above, E is

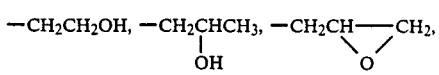

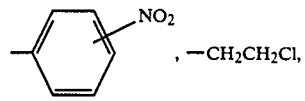

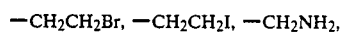

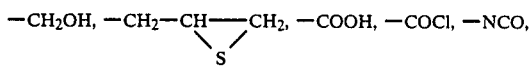

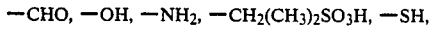

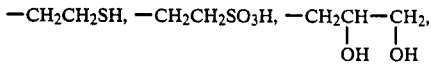

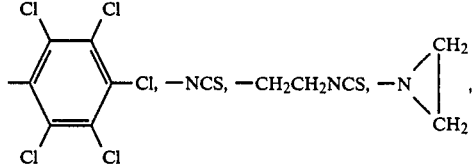

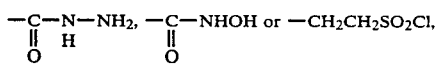

which may be protected by e.g. an acetyl group at the time of polymerization, if necessary, and l is 0 or 1, or a polymer obtained by the copolymerization of the monomer of the formula III with a monomer represented by the formula:

wherein $R^4$ and A are as defined above, with an amine derivative, an alcohol derivative, a carboxylic acid derivative or a thiol derivative which has, as a substituent, an aromatic group substituted by at least one electron accepting group selected from the group consisting of nitro, cyano, carbonyl, sulfonyl and halogen or by at least one electron donating group selected from the group consisting of alkyl, vinyl, allyl, amino, alkoxy and hydroxy, a pyridinium group, an aromatic quinonyl group, a naphthyl group, an anthryl group, a furyl group or a pyrrolyl group.

The monomer of the formula III includes 2-hydroxyethyl acrylate, 2-hydroxyethyl methacrylate, 2-hydroxypropyl methacrylate, glycidyl methacrylate, p-nitrophenyl acrylate, p-nitrophenyl methacrylate, 2-chloroethyl acrylate, N-(2-chloroethyl)acrylamide, 2-hydroxyethyl vinyl ether, 2-bromoethyl acrylate, 2-iodoethyl methacrylate, allylamine, allyl alcohol, N-

(2-hydroxyethyl)acrylamide, thioglycidyl acrylate, acrylic acid, methacrylic acid, acrylic acid chloride, methacrylic acid chloride, vinyl isocyanate, acrolein, vinyl alcohol, N-(2-methyl-2-sulfopropyl)acrylamide, 2-mercaptoethyl methacrylate, 2,3-dihydroxypropyl acrylate, pentachlorophenyl acrylate, vinyl thioisocyanate, acrylic acid hydrazide, acrylhydroxamic acid and 2-chlorosulfonylethyl acrylate.

The monomer of the formula IV includes ethylene, propylene, acrylonitrile, vinyl alcohol (protected by an acetyl group at the time of polymerization), acrylic acid, methacrylic acid, acrylamide, methacrylamide, methyl acrylate, ethyl acrylate, methyl methacrylate, propyl methacrylate, t-butyl methacrylate, dodecyl methacrylate, cyclohexyl methacrylate, stearyl methacrylate, 2-hydroxyethyl acrylate, 2-hydroxyethyl methacrylate, 2-hydroxypropyl methacrylate. N,N-dimethylacrylamide, N,N-diethylmethacrylamide, ethyl vinyl ether, n-hexyl vinyl ether and vinyl acetate.

Conventional methods such as radical copolymerization, ionic polymerization, redox polymerization and photopolymerization may be employed for the copolymerization of these monomers. Any one of bulk polymerization, solution polymerization and emulsion polymerization may be employed for the raidcal copolymerization. However, it is desirable to conduct the polymerization in a solvent, since the copolymerization can thereby be conducted by a homogeneous reaction, and a high molecular weight product can be obtained.

The radical initiator to be used for the reaction includes an organic peroxide such as benzoyl peroxide, di-t-butyl peroxide or lauroyl peroxide, and an azo compound such as azobisbutyronitrile or azobiscyclohexanonitrile. However, the radical initiator is not restricted to these specific examples.

As the solvent for the reaction, any solvent which is capable of homogeneously dissolving the monomers, may optionally be used. For instance, there may be mentioned N,N-dimethylformamide, N,N-dimethylacetamide, N-methylpyrrolidone, dimethylsulfoxide, tetrahydrofuran, ethyl acetate, butyl acetate, chloroform, acetone, methanol, ethanol or dioxane.

The polymerization reaction is preferably conducted within a temperature range of from 40° to 100° C., whereby the reaction proceeds efficiently.

When anion polymerization or group transfer polymerization is employed, a base, or an anionic catalyst or a Lewis acid is used, respectively, as a catalyst and the reaction is usually conducted within a range of from −110° to 60° C. The reaction is preferably conducted in a solvent. As the solvent, tetrahydrofuran, dimethoxyethane, dioxane, acetonitrile, N,N-dimethylformamide or an aromatic hydrocarbon may be employed.

As the base used, there may be mentioned butyl lithium, lithium diisopropylamide, lithium bis(trimethylsilyl)amide, phenyl lithium, phenyl magnesium bromide, potassium tert-butoxide or sodium tert-amyloxide.

As the anionic catalyst, there may be mentioned potassium fluoride, cesium fluoride, tetrabutyl ammonium fluoride, potassium perfluoride, trialkylsulfonium perfluoride, potassium cyanide or sodium azide.

As the Lewis acid, zinc bromide, zinc chloride, zinc iodide or dimethyl aluminum monochloride may be mentioned. When this catalyst is used, it is preferred to use an aromatic hydrocarbon or a halogenated hydrocarbon such as dichloromethane or dichloroethane, as the solvent.

The copolymer of the present invention preferably has a molecular weight of at least 10,000, more preferably at least 50,000, when it is used for a separating membrane. Further, the molar ratio of the repeating units of the formula I in the copolymer is preferably from 1 to 95 mol %, more preferably from 5 to 60 mol %. If the molar ratio of the repeating units of the formula I exceeds 95 mol %, a separating membrane made of such a copolymer will be inferior in the mechanical strength, and if the molar ratio is less than 1 mol %, the selectivity will be poor.

Specific examples of the copolymers having electron accepting groups include, for instance, copolymers composed of the following repeating units:

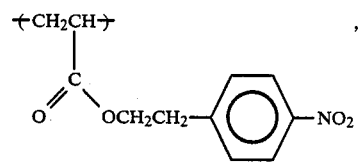

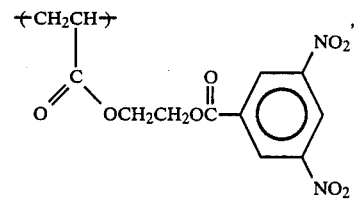

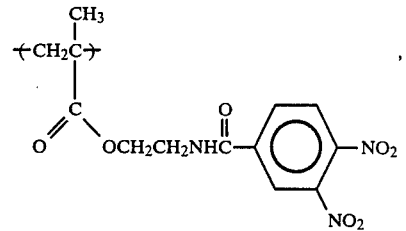

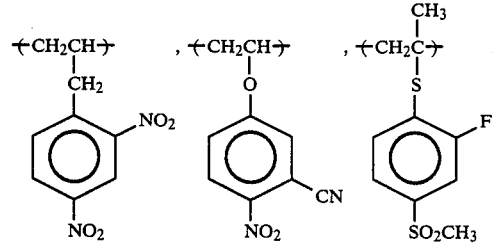

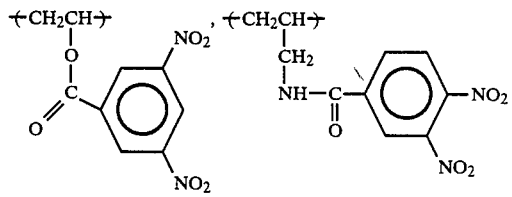

-continued
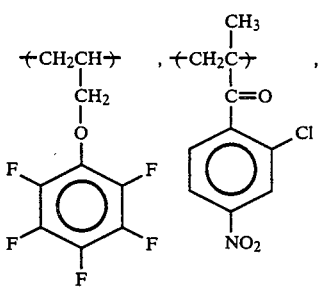
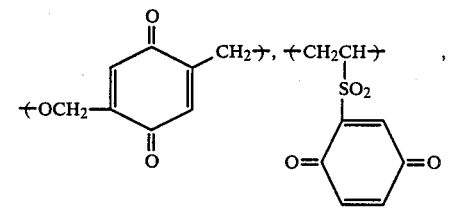
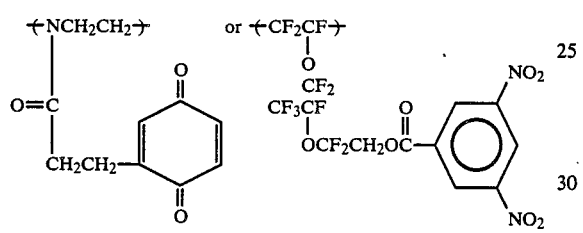
and the following repeating units:
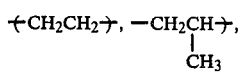
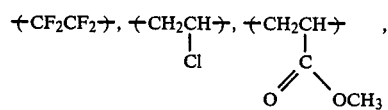
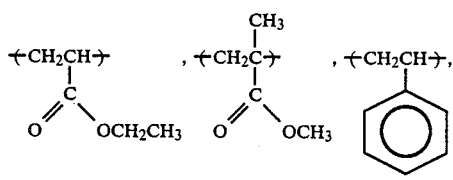
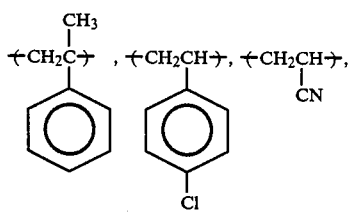
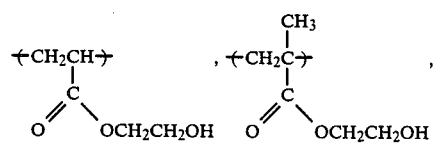
-continued
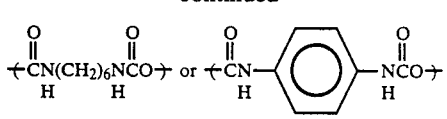
Likewise, specific examples of the copolymers of the present invention having electron donating groups include copolymers composed of the following repeating units:
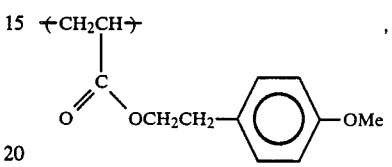
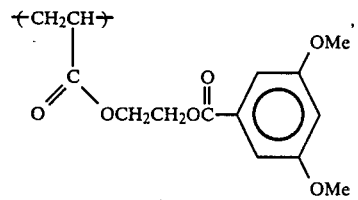
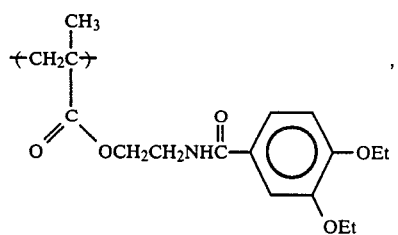
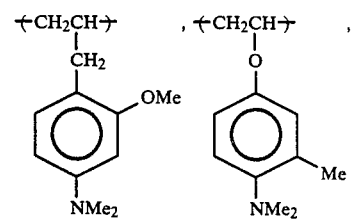
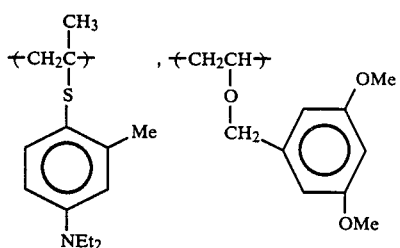
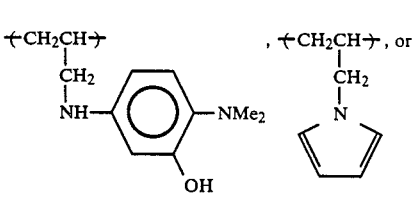

-continued

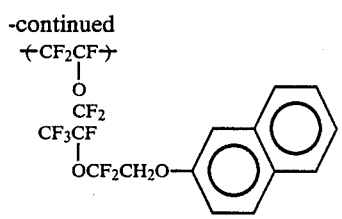

and the following repeating units:

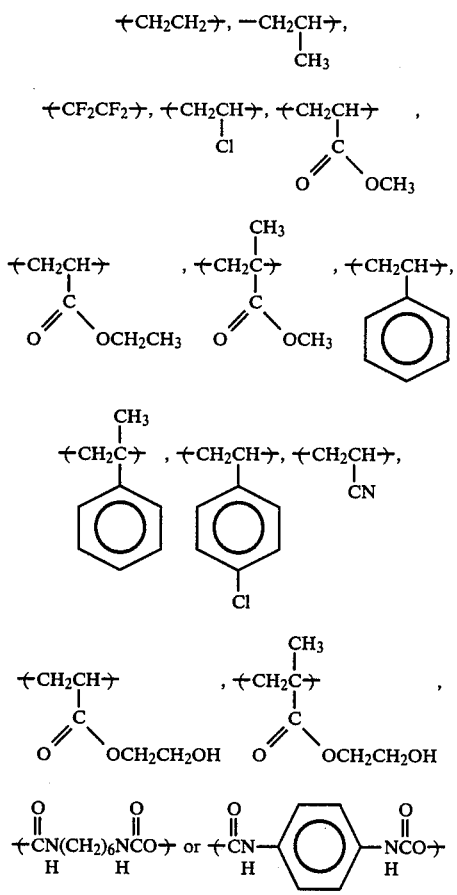

The copolymer may be formed into a membrane by dissolving it in a suitable solvent and casting its solution. The polymer membrane thus obtained has sufficient mechanical strength required for a separating membrane.

The polymer membrane of the present invention is employed preferably without subjecting it to cross linking treatment. However, in a case where the polymer membrane is likely to be swelled excessively or dissolved in the liquid mixture to be separated, it may be employed after being treated by cross linking treatment for non-solubilization.

The separating membrane of the present invention has a feature of selectively permeating aromatic compounds. The aromatic compounds separable by the separating membrane of the present invention include those having electron donating groups as nucleus-substituents, such as alkyl, vinyl, allyl or amino, those having electron accepting groups as nucleus-substituents, such as nitro, cyano, carbonyl, sulfonyl, ammonium or halogen, or benzene, naphthalene, anthracene, furan, pyrrole and pyridine. The separating membrane of the present invention is applicable to a liquid mixture containing at least one of these aromatic compounds.

For the separating membrane of the present invention to have adequate liquid permeability and practical strength, it preferably has a membrane thickness of from 0.01 to 200 μm, more preferably from 0.05 to 100 μm. In a case of a thin membrane having a thickness of 1 μm or less, it is preferred to use it in combination with a support. As such a support, there may be employed a woven or non-woven fabric support, or a porous material having sufficient strength for supporting a membrane such as a microfilter or a filter for ultrafiltration. The separating membrane of the present invention may be used in the form of a homogeneous membrane, an asymmetric membrane or a composite membrane with other membrane material. There is no particular restriction as to the manner for the membrane-forming, and any conventional methods may be employed. For instance, a strong membrane may be prepared by spreading a solution of the copolymer of the present invention on a polytetrafluoroethylene sheet, a metal sheet, a glass sheet or the surface of water, followed by evaporating the solvent. It is also possible to employ a method in which a porous support is dipped into such a copolymer solution and then withdrawn and dried, or a method in which such a solution is coated onto a support, followed by drying.

The organic solvent for the preparation of a solution of the copolymer is not critical, and any organic solvent may be employed so long as it is a good solvent for the copolymer.

In the present invention, the separating membrane may be employed in the form of a multilayered membrane with other membrane.

The membrane thus obtained may be used in any form including a sheet form, a tubular form or a hollow fiber form. The separating membrane of the present invention is useful for a membrane process wherein an organic liquid mixture is selectively permeated, and advantageously used for a pervaporation method in view of its separating efficiency.

By using the separating membrane of the present invention, it is now possible to efficiently and simply separate a mixture containing aromatic compounds which are hardly separable by conventional separation methods, such as an azeotropic mixture, a mixture of substances having close boiling points or a mixture of stereoisomers. For instance, it is useful for the separation of positional isomers of xylene.

Now, the present invention will be described with reference to Examples, Test Examples and Reference Examples. However, it should be understood that the present invention is by no means restricted by these specific Examples.

REFERENCE EXAMPLE 1

2-hydroxyethyl acrylate (HEA) and 2-hydroxyethyl methacrylate (HEMA) were charged into a glass polymerization ampoule in amounts of 17.57 ml and 8.60 ml, respectively, to bring the molar ratio of HEA/HEMA to be 0.7/0.3 and the total monomer concentration to be 2 mol/liter. Then, 93.83 ml of N,N-dimethylformamide (DMF) as a diluent and 0.0985 g of 2,2'-azobisisobutylonitrile (AIBN) as a polymerization initiator, were introduced into the ampoule. The ampoule was adequately evacuated and sealed under a highly vacuumed condition ($10^{-5}$ mmHg or less) in accordance with usual methods. The ampoule was shaken at 60° C. for 1 hour to conduct the polymerization reaction. The reaction mixture was diluted with methanol, and poured into a large amount of diethyl ether, whereupon a HEA—HEMA copolymer was obtained in a yield of 22.5%.

REFERENCE EXAMPLES 2 TO 7

HEA—HEMA copolymers were prepared in the same manner as in Reference Example 1 by varying the composition of HEA and HEMA feed materials. The results are shown in Table 1.

TABLE 1

Synthesis of HEA—HEMA copolymers

| Reference Example | HEA molar ratio In the feed | HEA molar ratio In the copolymer | Reaction time (hr) | Yield (%) |
|---|---|---|---|---|
| 2 | 0.6 | 0.75 | 1.0 | 15.0 |
| 3 | 0.5 | 0.69 | 1.0 | 9.9 |
| 4 | 0.4 | 0.56 | 1.0 | 11.8 |
| 5 | 0.3 | 0.41 | 1.0 | 21.4 |
| 6 | 0.2 | 0.27 | 1.0 | 17.5 |
| 7 | 0.1 | 0.13 | 1.0 | 18.1 |

AIBN concentration = $5 \times 10^{-3}$ mol/liter

REFERENCE EXAMPLES 8 TO 10

HEA—St copolymers were prepared in the same manner as in Reference Example 1 except that styrene (St) was used instead of HEMA as a monomer. The results are shown in Table 2.

TABLE 2

Synthesis of HEA—St copolymers

| Reference Example | HEA molar ratio In the feed | HEA molar ratio In the copolymer | Reaction time (hr) | Yield (%) |
|---|---|---|---|---|
| 8 | 0.9 | 0.93 | 2 | 13.3 |
| 9 | 0.8 | 0.81 | 10 | 26.3 |
| 10 | 0.7 | 0.69 | 10 | 28.2 |

AIBN concentration = $5 \times 10^{-3}$ mol/liter

EXAMPLE 1

6.51 g of the HEA—HEMA copolymer obtained in Reference Example 1 was dissolved in 100 ml of DMF, and 6.60 ml of pyridine was added thereto. The mixture was cooled to 0° C. While vigorously stirring the solution thereby obtained, 20 ml of a DMF solution containing 12.48 g of 3,5-dinitrobenzoyl chloride was dropwise added, and the mixture was reacted for 20 hours. After completion of the reaction, the reaction mixture was poured into a large amount of pure water, and the precipitated polymer was collected by filtration. The polymer was dissolved again in DMF, and the solution was dropwise added to diethyl ether, whereby the copolymer having 3,5-dinitrophenyl groups at side chains was purified. The yield of the copolymer after drying was 45.5%. In the measurement of the IR spectrum, absorptions were observed at 3100 cm$^{-1}$ and 1600 cm$^{-1}$ attributable to a phenyl group and at 1540 cm$^{-1}$ and 1345 cm$^{-1}$ attributable to an aromatic nitro group. From the elemental analysis, the degree of introduction of 3,5-dinitrophenyl groups was 60.7%. Further, the weight average molecular weight obtained by GPC (gel permeation chromatography) was $9.91 \times 10^4$ as calculated as polystyrene.

EXAMPLES 2 TO 10

In the same manner as in Example 1, 3,5-dinitrophenyl groups were introduced, at side chains, to the HEA—HEMA copolymers of Reference Examples 2 to 6 and to the HEA—St copolymers of Reference Examples 8 to 10. The rate of introduction was controlled by changing the ratio of the acid chloride to the hydroxyl group at the side chain of the copolymer ([COCl]/[OH]). The results are shown in Table 3.

TABLE 3

Synthesis of polymers having 3,5-dinitrophenyl groups at side chains

| Example | Copolymer | [COCl]/[OH] | Rate of introduction of 3,5-dinitrophenyl groups (mol %) | Yield (%) | Weight average molecular weight ($\times 10^4$)* |
|---|---|---|---|---|---|
| 2 | Reference Example 2 | 1.0 | 60.1 | 35.9 | 10.4 |
| 3 | Reference Example 3 | 1.0 | 22.2 | 42.9 | 8.71 |
| 4 | Reference Example 4 | 1.0 | 14.7 | 49.4 | — |
| 5 | Reference Example 5 | 1.0 | 49.8 | 33.2 | 6.51 |
| 6 | Reference Example 5 | 0.5 | 17.3 | 20.7 | — |
| 7 | Reference Example 6 | 1.0 | 6.1 | 33.5 | 5.10 |
| 8 | Reference Example 8 | 1.0 | 67.5 | 34.9 | 8.71 |
| 9 | Reference Example 9 | 1.0 | 50.9 | 46.9 | 9.15 |
| 10 | Reference Example 10 | 1.0 | 51.7 | 42.2 | 7.47 |

*The weight average molecular weight was calculated as polystyrene.

EXAMPLE 11

A copolymer having 3,4-dinitrophenyl groups at side chains was prepared in the same manner as in Example 1 by using the HEA—St copolymer of Reference Example 8 and 3,4-dinitrobenzoyl chloride at a molar ratio of [COCl]/[OH]=1.0. The rate of introduction of 3,4-dinitrophenyl groups was 53.0%, and the yield was 40.1%.

TEST EXAMPLE 1

A tetrahydrofuran solution containing 5% by weight of the copolymer of Example 9 was spread on a polytetrafluoroethylene sheet of 25 cm$^2$, and the solvent was removed by heating to obtain a transparent homogeneous polymer membrane. This membrane had a thickness of 86 μm.

The membrane thus obtained was inserted into a stainless steel pervaporation cell. Then, a mixture of m-xylene/o-xylene having various proportions was introduced into the cell and the permeation was measured by a pervaporation method. The results are shown in Table 4. Flux F (g/m$^2$·hr) was calculated in accordance with the following equation:

$$F = \frac{\text{Weight of permeated liquid}}{\text{Membrane surface area} \times \text{Time}} \ (\text{g/m}^2 \cdot \text{hr})$$

TABLE 4

Membrane permeation of xylene isomers

| m/o Weight ratio (m-xylene/o-xylene) | | Flux F (g/m² · hr) | Selectivity $a_o^{m*}$ |
|---|---|---|---|
| Feed liquid | Permeated liquid | | |
| 100/0 | 100/0 | 85.6 | — |
| 70.5/29.5 | 81.0/19.0 | 78.1 | 1.78 |
| 51.1/48.9 | 58.4/41.6 | 96.7 | 1.34 |
| 27.6/72.4 | 35.0/65.0 | 133.9 | 1.41 |

$*a_o^m = \dfrac{(m/o \text{ weight ratio in permeated liquid})}{(m/o \text{ weight ratio in feed liquid})}$

TEST EXAMPLE 2

A polymer membrane was prepared in the same manner as in Test Example 1 by using the copolymer of Example 1. The membrane thickness was 59 μm. By using this membrane, the permeation of a mixture of o-xylene/p-xylene (weight ratio: 52.8/47.2) was measured by a pervaporation method, whereby F was 44.1 g/m².hr and $a_p^o$ was 1.14.

TEST EXAMPLE 3

The permeation of a mixture of m-xylene/p-xylene (weight ratio: 51.5/48.5) was measured in the same manner as in Test Example 2 except that the membrane thickness was 52 μm, whereby F was 8.5 g/m².hr and $a_p^m$ was 1.95.

TEST EXAMPLE 4

A polymer membrane was prepared from the copolymer of Example 2 in the same manner as in Test Example 1. The membrane thickness was 120 μm. By using this membrane, the permeability of a mixture of benzene/cyclohexane was measured by a pervaporation method, whereby F was 10.3 g/m².hr when the benzene/cyclohexane weight ratio of the feed liquid was 53.1/46.9. The composition of the permeated liquid was 100% benzene.

Thus, only benzene was selectively permeated.

TEST EXAMPLE 5

The charge transfer interaction between ethyl 3,5-dinitrobenzoate having a structure extremely close to the functional groups of the copolymers of Examples 1 to 10 and the xylene isomers, was evaluated by a NMR method, whereby the charge transfer complex-forming coefficients of the p-isomer, the o-isomer and the m-isomer were 0.440, 0.528 and 0.580 (liter/mol), respectively. This indicates that the affinity of the copolymers with the xylene isomers increases in this order.

EXAMPLE 12

Synthesis of 2-hydroxyethyl acrylate-2-(pentafluorobenzoyloxy)ethyl acrylate copolymer 15.8 g of HEA was charged into a glass polymerization ampoule, and 97 ml of DMF as a diluent and 0.10 g of AIBN as a polymerization initiator were added. The ampoule was evacuated and sealed under a high vacuum condition ($10^{-5}$ mmHg or less) in accordance with usual methods. The ampoule was shaken at 60° C. for 2 hours to conduct the polymerization reaction. The reaction mixture was poured into a large amount of diethyl ether to obtain a homopolymer of HEA (PHEA) in a yield of 18.6%. The weight average molecular weight of this polymer was $4.1 \times 10^5$ as measured in DMF by GPC and calculated as polystyrene.

1.1 g of PHEA was dissolved in 50 ml of DMF, and after thoroughly substituting the atmosphere by argon, 20 ml of a DMF solution containing 1.5 g of pentafluorobenzoyl chloride was dropwise added thereto at 0° C. The mixture was stirred over night under argon atmosphere. Then, the temperature was raised to 50° C., and the stirring was continued for 1.5 hours. The reaction mixture was poured into a large amount of diethyl ether, whereby the polymer precipitated. The polymer was collected by filtration, and dissolved again in DMF, and precipitated in diethyl ether for purification, whereby the polymer was obtained in an amount of 1.8 g and in a yield of 69.2%. By the IR, NMR and elemental analyses, the polymer was confirmed to contain 27.1 mol % of pentafluorophenyl groups at the side chains (HEA—PFP). Further, from the GPC measurement, the molecular weight was found to be $4.0 \times 10^5$ as calculated as polystyrene.

IR(cm$^{-1}$): 3400(—OH), 2800(—CH$_2$—), 1730(C=O), 1650(hexa-substituted benzene ring), 1140(—C—F).

Elemental analysis (%): C, 46.9, H, 4.9.

EXAMPLE 13

Synthesis of acrylonitrile—N-(2-pentachlorophenylthioethyl)acrylamide copolymer 3.7 g of acrylonitrile (AN) and 5.8 g of p-nitrophenyl acrylate (PNPA) were charged into a glass polymerization ampoule, and 40 ml of DMF and 0.034 g of AIBN were added. The ampoule was evacuated and sealed under a high vacuum condition ($10^{-5}$ mmHg or less) in accordance with the usual methods. The ampoule was shaked at 60° C. for 4 hours to conduct the polymerization reaction. The reaction mixture was poured into a large amount of a water-methanol mixture (volume ratio of 1:9) to obtain an AN—PNPA copolymer in a yield of 14.2%. The PNPA content in the copolymer was found to be 39.9 mol % from the result of the elemental analysis, and the molecular weight was found to be $1.6 \times 10^5$ (GPC).

IR(cm$^{-1}$): 3100(disubstituted benzene ring), 2250(C≡N), 1760(C=O), 1530(N—O).

Elemental analysis (%): C, 59.2; H, 4.3; N, 13.0.

0.61 g of the AN—PNPA copolymer thus obtained was dissolved in 20 ml of DMF, and 20 ml of a DMF solution containing 1.28 g of 2-(pentachlorophenylthio)ethylamine (PCP) was dropwise added thereto at room temperature. The mixture was stirred overnight, and then the temperature was raised to 60° C., and the reaction was continued for further 4 hours. The reaction mixture was poured into a large amount of methanol, whereby the polymer precipitated. The polymer was collected by filtration and vacuum-dried to obtain 0.60 g of the polymer. From the IR measurement, it was confirmed that PCP was quantitatively introduced into the polymer by the ester-amide exchange with the PNPA sites to form an AN—N-(2-pentachlorophenylthioethyl)acrylamide (PCAm) copolymer.

The PCAm content in the AN—PCAm copolymer was 39.5 mol %, and the molecular weight was $1.6 \times 10^5$.

IR(cm$^{-1}$): 2800(—CH$_2$—), 2200(C≡N), 17600(C=O), 1440(—S—), 1050-1100(C—Cl), 870(hexa-substituted benzene ring).

Elemental analysis (%): C, 40.1; H, 2.7; N, 7.6; S, 7.0; Cl, 37.4.

EXAMPLE 14

Synthesis of acrylonitrile—vinyl pentafluorobenzoate copolymer 4.8 g of AN and 5.2 g of vinyl acetate (VAc) were charged into a glass polymerization ampoule, and 40 ml of DMF and 0.034 g of AIBN were added. The ampoule was evacuated and sealed under a high vacuum condition ($10^{-5}$ mmHg or less) in accordance with a conventional method. The ampoule was shaked at 60° C. for 17 hours to conduct the polymerization reaction. The reaction mixture was poured into a large amount of methanol, whereupon an AN—VAc copolymer was obtained in an amount of 3.61 g and in a yield of 36.3%. The structure of the copolymer was ascertained by IR, and the VAc content calculated from the values obtained by the elemental analysis was 16.0 mol %. The molecular weight was $2.1 \times 10^5$.

IR($cm^{-1}$): 2800(—$CH_2$—), 2200(C≡N), 1740(C=O).

Elemental analysis (%): C, 63.9; H, 5.9; N, 20.1.

2 g of the AN—VAc copolymer was dissolved in a mixture of DMF-water (volume ratio of 2:1), and 15 ml of an aqueous solution containing 0.36 g of sodium hydroxide was added thereto. The mixture was stirred at room temperature for 5 hours. The reaction mixture was poured into a large amount of methanol, whereupon the polymer precipitated. The amount was 1.6 g, and the yield was 80%.

From the results of the IR measurement of this polymer, the absorption attributable to C=O observed at 1740 $cm^{-1}$ in the case of the AN—VAc polymer completely disappeared, and a new absorption attributable to a —OH group was observed around 3400 $cm^{-1}$. Thus, the polymer was confirmed to be an AN—VA copolymer having a structure of poly(vinyl alcohol) (VA) wherein the VAc sites had been all saponified.

Elemental analysis (%): C, 66.1; H, 6.2; N, 23.0.

0.8 g of the AN—VA copolymer thus obtained, was dissolved in DMF, and after thoroughly substituting the atmosphere by argon, 20 ml of a DMF solution containing 1.0 g of pentafluorobenzoyl chloride was dropwise added thereto at 0° C. The mixture was stirred overnight under argon atmosphere. Then, the temperature was raised to 50° C., and the stirring was continued for further 1.5 hours. The reaction mixture was poured into a large amount of methanol, whereupon the polymer precipitated. The amount was 1.4 g, and the yield was 77.8%.

From the results of the IR measurement of the polymer, the polymer was confirmed to be an AN—vinyl pentafluorobenzoate (PFBV) copolymer wherein the hydroxyl groups of the AN—VA copolymer were substituted by the pentafluorobenzoic acid ester. From the results of the elemental analysis, the PFBV content in the copolymer was 15.8%.

IR($cm^{-1}$): 2800($CH_2$), 2200(C≡N), 1730(C=O), 1650(hexa-substituted benzene ring), 1140(C—F).

Elemental analysis (%): C, 57.6; H, 1.3: N, 14.2.

Molecular weight=$1.7 \times 10^5$ (GPC).

EXAMPLE 15

Synthesis of acrylonitrile—3-(2,4-dicyanophenyl) oxy-2-hydroxypropyl methacrylate copolymer 4.25 g of AN and 1.42 g of glycidyl methacrylate (GMA) were charged into a glass polymerization ampoule, and 43.8 ml of THF and 0.034 g of AIBN were added. The ampoule was evacuated and sealed under a high vacuum condition ($10^{-5}$ mmHg or less) in accordance with a conventional method. The ampoule was shaked at 60° C. for 24 hours to conduct the polymerization reaction. The reaction mixture was poured into a large amount of methanol, whereupon an AN—GMA copolymer was obtained in a yield of 11.8%. The GMA content in the copolymer was 26.3 mol % from the values obtained by the elemental analysis, and the molecular weight was $4.1 \times 10^5$.

IR($cm^{-1}$): 2800-2900(—$CH_2$—, —$CH_3$), 2250(C≡N), 1735(C=O), 1260, 910, 760 (epoxy ring).

Elemental analysis (%): C, 63.4; H, 6.4; N, 13.4.

0.6 g of the AN—GMA copolymer was dissolved in 15 ml of dimethylsulfoxide (DMSO), and 40 ml of a DMSO solution containing 0.2 g of 2,4-dicyanophenol and 0.07 g of sodium hydroxide, were added thereto, and the mixture was stirred at 60° C. overnight. After completion of the reaction, DMSO was distilled off under vacuum, and 15 ml of DMF was added to obtain a homogeneous solution again. The solution was poured into a large amount of methanol, whereupon a polymer precipitated. The precipitates were collected by filtration, dried and subjected to the IR measurement. The absorptions at 1260 $cm^{-1}$, 910 $cm^{-1}$ and at 760 $cm^{-1}$ attributable to an epoxy ring disappeared, and absorptions attributable to a hydroxyl group and to a tri-substituted benzene ring appeared around 1600 $cm^{-1}$ and 850 $cm^{-1}$. Thus, the polymer was confirmed to be an AN—3-(2,4-dicyanophenyl)oxy-2-hydroxypropyl methacrylate (DCPM) copolymer wherein 2,4-dicyanophenol was reacted to the epoxy groups. The DCPM content in the copolymer was 25.9 mol %, and the molecular weight was $3.2 \times 10^5$ (GPC).

IR($cm^{-1}$): 3400(—OH), 2800-2900(—$CH_2$—, —$CH_3$), 2200-2250(C≡N), 1735(C=O), 1600 and 850 (tri-substituted benzene ring).

Elemental analysis (%): C, 64.7; H, 5.16; N, 15.5.

EXAMPLE 16

Synthesis of acrylonitrile—N-[2-(2,3-dicyano-5-chloro-1,4-benzoquinonylthio)ethyl]acrylamide copolymer 0.8 g of the AN—PNPA copolymer obtained in Example 13 was dissolved in 20 ml of DMSO, and 20 ml of a DMF solution containing 0.6 g of 2,3-dicyano-5-chloro-6-(2-aminoethyl)thio-1,4-benzoquinone(DCQ) was added thereto. The mixture was stirred at room temperature overnight. The reaction mixture was poured into a large amount of a mixture of methanol-acetonitrile (volume ratio of 3:1), whereupon a polymer precipitated. The polymer was collected by filtration and vacuum-dried to obtain 1.0 g of the polymer. As a result of the IR measurement, it was confirmed that DCQ was quantitatively introduced into the polymer by the eser-amide exchange with the PNPA sites to give an AN—N-[2-(2,3-dicyano-5-chloro-1,4-benzoquinonylthio)ethyl]acrylamide (DCAm) copolymer. The DCAm content in the AN—DCAm copolymer was 38.4 mol %, and the molecular weight was $1.1 \times 10^5$ (GPC).

IR($cm^{-1}$): 2900(—$CH_2$—), 2250(C≡N), 1740(C=O), 1050-1100(C—Cl).

Elemental analysis (%): C, 52.6; H, 3.1; N, 15.9; S, 7.87; Cl, 8.7.

TEST EXAMPLE 6

1 g of the HEA—PFP copolymer obtained in Example 12 was dissolved in 10 ml of DMF. Then, the solution was spread on a Tefron plate of 50 cm², and DMF was distilled off at 40° C. Further, the film thus formed was vacuum-dried at 60° C. overnight to obtain a homogeneous transparent membrane having a thickness of 65 μm. This membrane was inserted into a stainless pervaporation cell, and the permeation of a mixture of benzene (Bz)-cyclohexane (Ch) was conducted by reducing the pressure at the permeated side to 0.5 mmHg. The composition of the mixture permeated through the membrane was detected by TCD-gas chromatography, and the pervaporation rate P (g·m/m²·hr) and the selectivity α were calculated in accordance with the following equations.

$$P = \frac{\text{Permeated liquid weight} \times \text{Membrane thickness}}{\text{Membrane surface area} \times \text{Time}} \ (g \cdot m/m^2 \cdot hr)$$

$$\alpha_A{}^B = \frac{(\text{Weight ratio of component } B \text{ in permeated liquid}/\text{Weight ratio of component } A \text{ in permeated liquid})}{(\text{Weight ratio of component } B \text{ in feed liquid}/\text{Weight ratio of component } A \text{ in feed liquid})}$$

At a ratio of Bz/Ch=33.08/66.92 of the feed liquid, P was $1.58 \times 10^{-3}$ g·m/m²·hr, and α was 4.83.

TEST EXAMPLES 7 to 14

0.5 g of the copolymers obtained in Examples 13 to 16 were respectively dissolved in 5 ml of DMF. Each solution was spread on a glass plate, and the solvent was removed off at 50° C. for 4 hours. Then, the glass plate with the formed membrane was dipped in water, and the membrane was peeled off.

All the membranes thus obtained were homogeneous and transparent. By using these membranes, the permeation of the liquid mixture was measured in the same manner as in Test Example 6. The results thereby obtained are shown in Table 5.

(DMF) as a diluent and 0.082 g of AIBN as a polymerization initiator, were introduced into the ampoule. The ampoule was adequately evacuated and sealed under a highly vacuumed condition ($10^{-5}$ mmHg was shaked at 60° C. for 1 hour to conduct the polymerization reaction. The reaction mixture was diluted with methanol, and poured into a large amount of diethyl ether, whereupon 6.5 g of a HEA—HEMA copolymer was obtained in a yield of 22.5%. HEA molar ratio in the copolymer is 0.467 based on NMR.

1.00 g of the HEA—HEMA copolymer obtained above was dissolved in 30 ml of pyridine, and 1.68 ml of triethylamine was added thereto. The mixture was cooled to 0° C. While vigorously stirring the solution thereby obtained, 20 ml of pyridine solution containing 2.5 g of 3,4-dimethoxybenzoyl chloride was dropwise added, and the mixture was reacted at 70° C. for 20 hours. After completion of the reaction, the reaction mixture was poured into a large amount of pure water, and the precipitated polymer was collected by filtration. The polymer was dissolved again in DMF, and the solution was dropwise added to diethyl ether, whereby the copolymer having 3,4-dimethoxyphenyl groups at side chains was purified. The yield of the copolymer after drying was 89.9%. In the measurement of the IR spectrum, absorptions were observed at 3100 cm$^{-1}$ and 1600 cm$^{-1}$ attributable to a phenyl group and at 1720–1700 cm$^{-1}$ attributable to a carbonyl group. From the elemental analysis, the degree of introduction of 3,4-dimethoxyphenyl groups was 55.0 mol %.

Elemental analysis (%): C, 58.52; H, 6.29.

EXAMPLE 18

HEMA were charged into a glass polymerization ampoule in amounts of 20.9 g and 7.81 g, respectively, to bring the molar ratio of HEA/HEMA to be 0.75/0.25 and the total monomer concentration to be 2 mol/liter. Then, 91.12 ml of N,N-dimethylacetamide (DMAc) as a diluent and 0.082 g of AIBN as a polymerization initiator, were introduced into the ampoule. The ampoule was adequately evacuated and sealed under a

TABLE 5

| Test Example | Polymer membrane | The permeation of the polymer membranes | | | | |
|---|---|---|---|---|---|---|
| | | Thickness (μm) | Feed liquid mixture (B/A) | Weight ratio of feed components | P (g · m/m² · hr) | $\alpha_A{}^B$ |
| 7 | Example 13 (AN—PCAm copolymer) | 35 | m-xylene/p-xylene | 50.13/49.87 | $4.59 \times 10^{-3}$ | 1.17 |
| 8 | Example 13 (AN—PCAm copolymer) | 42 | benzene/cyclohexane | 49.89/50.11 | $3.14 \times 10^{-3}$ | 3.61 |
| 9 | Example 14 (AN—PFBV copolymer) | 60 | m-xylene/p-xylene | 49.79/50.21 | $2.13 \times 10^{-3}$ | 1.63 |
| 10 | Example 14 (AN—PFBV copolymer) | 57 | styrene/ethylbenzene | 51.89/48.11 | $1.45 \times 10^{-3}$ | 2.01 |
| 11 | Example 15 (AN—DCPM copolymer) | 25 | m-xylene/p-xylene | 50.36/49.64 | $1.31 \times 10^{-3}$ | 1.74 |
| 12 | Example 15 (AN—DCPM copolymer) | 30 | benzene/cyclohexane | 50.23/49.77 | $2.91 \times 10^{-3}$ | 4.12 |
| 13 | Example 16 (AN—DCAm copolymer) | 38 | m-xylene/p-xylene | 49.91/50.09 | $2.89 \times 10^{-3}$ | 1.86 |
| 14 | Example 16 (AN—DCAm copolymer) | 40 | benzene/cyclohexane | 32.91/67.09 | $1.60 \times 10^{-3}$ | 5.71 |

EXAMPLE 17

2-hydroxyethyl acrylate (HEA) and 2-hydroxyethyl methacrylate (HEMA) were charged into a glass polymerization ampoule in amounts of 19.51 g and 9.37 g, respectively, to bring the molar ratio of HEA/HEMA to be 0.7/0.3 and the total monomer concentration to be 2 mol/liter. Then, 91.12 ml of N,N-dimethylformamide highly vacuumed condition ($10^{-5}$ mmHg or less) in accordance with usual methods. The ampoule was shaked at 60° C. for 1.5 hour to conduct the polymerization reaction. The reaction mixture was diluted with methanol, and poured into a large amount of diethyl ether, whereupon 7.6 g of a HEA—HEMA copolymer was obtained in a yield of 26%. HEA molar ratio in the copolymer is 0.673 based on NMR.

1.00 g of the HEA—HEMA copolymer obtained above was dissolved in 30 ml of pyridine, and 1.68 ml of triethylamine was added thereto. The mixture was cooled to 0° C. While vigorously stirring the solution thereby obtained, 20 ml of pyridine solution containing 2.5 g of 2,3-dimethoxybenzoyl chloride was dropwise added, and the mixture was reacted at 70° C. for 20 hours. After completion of the reaction, the reaction mixture was poured into a large amount of pure water, and the precipitated polymer was collected by filtration. The polymer was dissolved again in DMF, and the solution was dropwise added to diethyl ether, whereby the copolymer having 2,3-dimethoxyphenyl groups at side chains was purified. The yield of the copolymer after drying was 85.6%. In the measurement of the IR spectrum, absorptions were observed at 3100 $cm^{-1}$ and 1600 $cm^{-1}$ attributable to a phenyl group and at 1735 $cm^{-1}$ attributable to a carbonyl group. From the elemental analysis, the degree of introduction of 2,3-dimethoxyphenyl groups was 81.3 mol %.

Elemental analysis (%): C, 59.75; H, 6.16%.

TEST EXAMPLES 7 and 8

A DMF solution (5 ml) containing 5% by weight of the copolymer of Examples 17 or 18 was spread on a polyethylene sheet of 25 $cm^2$, and the solvent was removed by heating to obtain a transparent homogeneous polymer membrane.

The membranes thus obtained were inserted into a stainless steel pervaporation cell. Then, a mixture of dichlorotoluene (DCT) isomers was used as feed solution and the permeation was measured by a pervaporation method. Pervapoation rate P and selectivity of 2,5-DCT ($\alpha^{2,5}$) against 2,4-DCT and 2,6-DCT was calculated according to equations similar to those at Test Example 6. The results are shown in Table 6.

TABLE 6

| | | | Pervaporation of mixtures of dichlorotoluene isomers | | | |
|---|---|---|---|---|---|---|
| Test example | Copolymer | Membrane thickness (μm) | Molar ratio of DCT isomers (2,5-DCT/2,6-DCT/2,4-DCT) | | P (g · m/$m^2$ · hr) | $\alpha^{2,5}$ |
| | | | Feed liquid | Pereated liquid | | |
| 7 | Ex. 17 | 80 | 40.0/35.0/25.0 | 48.9/30.6/20.5 | $5.47 \times 10^{-6}$ | 1.44 |
| 8 | Ex. 18 | 60 | 35.0/35.0/30.0 | 51.3/33.9/14.7 | $9.78 \times 10^{-4}$ | 1.96 |

What is claimed is:

1. A method comprising separating two organic substances distinguished by their degree of charge transfer interactiveness with a copolymer having a charge interactive group, by, passing at least a portion of a liquid composition comprising said two organic substances through a membrane made of a copolymer having a charge interactive group which is an aromatic group substituted by at least two substituents selected from the group consisting of a nitro group, a cyano group, alkoxy groups, dialkylamino groups, perhalogeno aromatic groups and a quinonyl group, provided in proportions sufficient to enable said charge transfer interactiveness; and obtaining, by selective permeation through the membrane, a product containing an enriched amount of the organic substance having a higher degree of said charge transfer interactiveness.

2. The method of claim 1, wherein said membrane is made of a copolymer having a charge interactive group attached to the main chain of said copolymer.

3. The method of claim 1, wherein said charge interactive group comprises an aromatic group substituted by a nitro group.

4. The method of claim 1, wherein said charge interactive group comprises an aromatic group substituted by a cyano group.

5. The method of claim 1, wherein said charge interactive group comprises an aromatic group 6. The method of claim 1, wherein said charge interactive group comprises an aromatic group substituted by a dialkylamino group.

7. The method of claim 1, wherein said charge interactive group comprises an aromatic group substituted by a perhalogeno aromatic group.

8. The method of claim 1, wherein said charge interactive group comprises an aromatic group substituted by a quinonyl group.

9. The method of claim 1, wherein said organic substances distinguished by their degree of charged transfer interactiveness comprise an aromatic compound.

10. The method of claim 1, wherein said membrane has a thickness of from 0.01 to 200 micrometers.

11. The method of claim 10, wherein said thickness is from 0.05 to 100 micrometers.

12. The method of claim 1, wherein said membrane is supported.

13. The method of claim 1, wherein said organic substances distinguished by their degree of charge interactiveness are either a combination of benzene and cyclohexane or a combination of styrene or ethylbenzene.

14. The method of claim 1, wherein said membrane is supported and said support comprises a woven fabric support, a non-woven fabric support, a microfilter, or a filter for ultrafiltration.

15. The method of claim 1, wherein said two organic substances distinguished by their degree of charge transfer interactiveness comprise xylene.

16. A method comprising separating positional isomers of xylene distinguished by their degree of charge transfer interactiveness with a copolymer having a charge interactive group, by, passing at least portion of a liquid composition comprising said positional isomers of xylene through a membrane made of a copolymer having a charge interactive group which is an aromatic group substituted by at least two substituents selected from the group consisting of a nitro group, a cyano group, alkoxy groups, dialkylamino groups, perhalogeno aromatic groups and a quinonyl group, provided in proportions sufficient to enable said charge transfer interactiveness;

obtaining, by selective permeation through the membrane, a product containing an enriched amount of the xylene isomer having a higher degree of said charge transfer interactiveness.

17. The method of claim 16, comprising separating m-xylene and o-xylene, or separating o-xylene and p-xylene, or separating m-xylene and p-xylene, or separating o-xylene, m-xylene and p-xylene.

18. A method comprising separating two organic substances distinguished by their degree of charge transfer interactiveness with a copolymer having a charge interactive group, by, passing at least a portion of a liquid composition comprising said two organic substances through a membrane made of a copolymer having a charge interactive group which is an aromatic group substituted by at least two substituents selected from the group consisting of a nitro group, a cyano group, alkoxy groups, dialkylamino groups, perhalogeno aromatic groups and a quinonyl group, provided in proportions sufficient to enable said charge transfer interactiveness; and obtaining, by selective permeation through the membrane, a product containing an enriched amount of the organic substance having a lower degree of said charge transfer interactiveness.

19. The method of claim 18, wherein said membrane is made of a copolymer having a charge interactive group attached to the main chain of said copolymer.

20. The method of claim 18, wherein said charge interactive group comprises an aromatic group substituted by a nitro group.

21. The method of claim 18, wherein said charge interactive group comprises an aromatic group substituted by a cyano group.

22. The method of claim 18, wherein said charge interactive group comprises an aromatic group substituted by an alkoxy group.

23. The method of claim 18, wherein said charge interactive group comprises an aromatic group substituted by a dialkylamino group.

24. The method of claim 18, wherein said charge interactive group comprises an aromatic group substituted by a perhalogeno aromatic group.

25. The method of claim 18, wherein said charge interactive group comprises an aromatic group substituted by a quinonyl group.

26. The method of claim 18, wherein said organic substances distinguished by their degree of charged transfer interactiveness comprise an aromatic compound.

27. The method of claim 18, wherein said membrane has a thickness of from 0.01 to 200 micrometers.

28. The method of claim 27, wherein said thickness is from 0.05 to 100 micrometers.

29. The method of claim 18, wherein said membrane is supported.

30. The method of claim 18, wherein said organic substances distinguished by their degree of charge interactiveness are either a combination of benzene and cyclohexane or a combination of styrene or ethylbenzene.

31. The method of claim 18, wherein said membrane is supported and said support comprises a woven fabric support, a non-woven fabric support, a microfilter, or a filter for ultrafiltration.

32. The method of claim 18, wherein said two organic substances distinguished by their degree of charge transfer interactiveness comprise xylene.

33. A method comprising separating positional isomers of xylene distinguished by their degree of charge transfer interactiveness with a copolymer having a charge interactive group, by, passing at least portion of a liquid composition comprising said positional isomers of xylene through a membrane made of a copolymer having a charge interactive group which is an aromatic group substituted by at least two substituents selected from the group consisting of a nitro group, a cyano group, alkoxy groups, dialkylamino groups, perhalogeno aromatic groups and a quinonyl group, provided in proportions sufficient to enable said charge transfer interactiveness;

obtaining, by selective permeation through the membrane, a product containing an enriched amount of the xylene isomer having a lower degree of said charge transfer interactiveness.

34. The method of claim 33, comprising separating m-xylene and o-xylene, or separating o-xylene and p-xylene, or separating m-xylene and p-xylene, or separating o-xylene, m-xylene and p-xylene.

* * * * *